United States Patent [19]

Walden

[11] 4,019,872
[45] Apr. 26, 1977

[54] PRODUCING SODIUM CARBONATE MONOHYDRATE FROM CARBONATE SOLUTION INCLUDING ADDITION OF ALUMINUM IONS

[75] Inventor: John Walden, Hightstown, N.J.

[73] Assignee: Intermountain Research and Development Corporation, Green River, Wyo.

[22] Filed: Apr. 30, 1975

[21] Appl. No.: 573,172

Related U.S. Application Data

[63] Continuation-in-part of Ser. No. 436,999, Jan. 28, 1974, abandoned.

[52] U.S. Cl. .............................. 23/300; 23/302 T; 423/206 T; 423/421
[51] Int. Cl.² ...................... C01D 7/00; B01D 9/02; C01D 7/12; C01D 7/24
[58] Field of Search ............ 23/300, 302; 423/206, 423/184, 206 T, 421

[56] References Cited

UNITED STATES PATENTS

| | | |
|---|---|---|
| 96,374 | 11/1869 | Wuth ............................ 23/302 T |
| 2,099,079 | 11/1937 | Rumsheidt ........................... 23/300 |
| 2,436,670 | 2/1948 | Russell ................................. 23/300 |
| 2,470,822 | 5/1949 | Johnson ............................... 23/300 |
| 2,962,348 | 11/1960 | Seglin .............................. 23/302 T |
| 3,082,060 | 3/1963 | Snyder ............................. 23/302 T |
| 3,131,996 | 5/1964 | Seglin .............................. 23/302 T |
| 3,259,471 | 7/1966 | Cortessis .......................... 23/302 T |
| 3,486,844 | 12/1969 | Tabler ............................. 423/206 T |
| 3,628,919 | 12/1971 | Beauchamp .................... 23/302 T |
| 3,655,331 | 4/1972 | Seglin .............................. 23/302 T |
| 3,725,014 | 4/1973 | Roncha ........................... 23/302 T |

*Primary Examiner*—Stephen J. Emery
*Attorney, Agent, or Firm*—Pauline Newman; Frank Ianno; Gary M. Nath

[57] ABSTRACT

Process for producing high bulk density sodium carbonate monohydrate crystals from sodium carbonate solutions wherein the sodium carbonate monohydrate is crystallized in the presence of at least 30 parts per million soluble aluminum ions.

7 Claims, 4 Drawing Figures

PRODUCING SODIUM CARBONATE MONOHYDRATE FROM CARBONATE SOLUTION INCLUDING ADDITION OF ALUMINUM IONS

CROSS REFERENCE TO RELATED APPLICATIONS

This application is a continuation-In-Part of Ser. No. 436,999, filed Jan. 28, 1974, now abandoned.

This invention relates to an improved process for the production of sodium carbonate (soda ash) from crude trona.

In Sweetwater and adjacent counties in the vicinity of Green River, Wyoming, trona deposits are found at depths ranging from about 800 to about 1800 feet underground. The main trona bed varies from 8 to 18 feet in thickness and other beds of less thickness separated by layers of shale are usually found above the main trona bed. The trona consists mainly of sodium sesquicarbonate ($Na_2CO_3 \cdot NaHCO_3 \cdot 2H_2O$) and four to six percent insoluble materials consisting mainly of shale. A typical analysis of the crude trona from which the larger pieces of shale have been removed is:

| Constituent | Percent |
| --- | --- |
| $Na_2CO_3$ | 43.50 |
| $NaHCO_3$ | 36.11 |
| $H_2O$ | 13.14 |
| $Na_2SO_4$ | 0.02 |
| NaCl | 0.09 |
| $Fe_2O_3$ | 0.14 |
| Organic Matter | 0.30 |
| Insolubles | 6.70 |

Various processes for the production of sodium carbonate from crude trona are known. One such process is the monohydrate process, disclosed in U.S. Pat. No. 2,962,348 issued to Seglin et al on Nov. 29, 1960. In this process, crude trona, after being crushed and screened, is calcined directly to form crude sodium carbonate. The crude sodium carbonate is dissolved in an aqueous solvent to form a substantially saturated solution of crude sodium carbonate. The crude sodium carbonate solution is then clarified and/or filtered to remove insolubles and subsequently crystallized, preferably in evaporative crystallizers to form sodium carbonate monohydrate. The monohydrate crystals are then calcined to produce a dense soda ash.

One difficulty that has arisen in the operation of the monohydrate process has been the presence of soluble organic impurities in the crude sodium carbonate solution during crystallization of the sodium carbonate. These organic impurities consist mainly of kerogenaceous material such as carboxylic acids, sodium salts of carboxylic acids, and rosin acids present in the trona as well as conventionally added organic surface active agents which are used to assist in the crystallization process. The production of sodium carbonate monohydrate crystals with high bulk densities and with good particle sizing, that is, particle size distributions, however, is hindered by the presence of the soluble organic impurities even when the impurities are present in trace quantities. These impurities apparently interfere with the desirable growth of short, thick, sharp-angled crystals and instead produce long, thin, rounded-crystals which tend to break easily and cause objectionable dusting when handled. Furthermore, these latter crystals are difficult to separate from solution.

Various processes have been proposed to overcome this problem in an attempt to prepare good sodium carbonate crystals. These processes have generally been concerned either with lowering the organic impurity concentration during sodium carbonate crystallization or with the use of a crystal growth additive during sodium carbonate monohydrate crystallization. British Patent 1,211,984 discloses one method wherein the effect of the organic impurities upon sodium carbonate crystallization is reduced by growing sodium carbonate crystals at one crystallization temperature and then feeding separated mother liquor which has an increased organic impurity concentration relative to the initial feed liquor to another crystallizer operated at a higher temperature. When the organic carbon level of the liquor is between 300 ppm carbon and 5,000 ppm carbon calculated on a sodium carbonate solution basis, a portion of the liquor is purged from the crystallizers and discarded as waste. While this process produces acceptable bulk density crystals, operation of the process results in a substantial loss of valuable carbonate values present in the discarded purge stream. U.S. Pat. No. 3,260,567 discloses the use of carbon towers to treat a clarified sodium carbonate solution with activated carbon prior to and after crystallization in order to remove a substantial portion of the soluble organic impurities. This process, however, requires constant maintenance and is often not capable of sufficiently reducing the soluble organic concentration. Still another method disclosed in U.S. Pat. No. 3,486,844 involves performing the crystallization step in the presence of small amounts of silicate ions, sulfate ions, and a water-soluble carbohydrate gum. This method requires the use of expensive additives and elaborate testing procedures.

It has now been unexpectedly discovered that high bulk density sodium carbonate monohydrate crystals can be easily, efficiently and economically produced by adding to an aqueous solution of sodium carbonate a crystal growth additive selected from the group consisting of (1) at least 30 parts per million soluble aluminum ions, and (2) at least 1,000 parts per million soluble silicate ions calculated as $SiO_2$; crystallizing sodium carbonate monohydrate from the sodium carbonate solution; and recovering the sodium carbonate monohydrate crystals.

The sodium carbonate crystals produced according to this invention have high bulk densities; nearly uniform crystal shapes; and increased particle size distributions. These properties make the crystals less friable so they can be handled easily without breakage and without objectionable dusting. These properties also decrease the segregating tendencies of the crystals when the crystals are used in commercial formulations, which is commercially important. Furthermore, the crystals produced by this invention are easily separated from solution and easily dried. The term "high bulk density" as used herein refers to sodium carbonate crystals having bulk densities from about 50 to about 65 lbs/ft$^3$.

According to this invention, sodium carbonate monohydrate crystals are produced from conventionally prepared aqueous sodium carbonate solutions by adding to the aqueous sodium carbonate solutions a crystal growth additive selected from the group consisting of soluble aluminum ions and soluble silicate ions. Any organic or inorganic water-soluble aluminum salt may be used to supply the soluble aluminum ions, such as aluminum nitrate, aluminum sulfate, aluminum silicate, aluminum ammonium sulfate, aluminum potassium sulfate, aluminum sodium sulfate, aluminum acetylsalicylate, aluminum borate, aluminum butoxide, aluminum carbide, aluminum chloride, and aluminum isopropylate. Aluminum nitrate is the preferred salt due to its good solubility and economic cost. These salts may be added to the aqueous sodium carbonate solution as solid salts, or as a solution containing dissolved salts. The soluble silicate ions are calculated as $SiO_2$ and may be derived from silica gel, silicic acid, sodium silicate and other conventional sources of soluble silicate ions. These may be added directly to the aqueous sodium carbonate solution or as a solution containing the materials dissolved therein.

The amount of additive that must be added to the sodium carbonate solution from which sodium carbonate monohydrate is crystallized will vary, for example, on such factors as the amount of sodium carbonate present in solution, the soluble organic impurity concentration, and the temperature at which the crystallization is performed. At least about 30 parts per million and preferably about 30 to about 300 parts per million of soluble aluminum ions, and at least about 1,000 parts per million and preferably about 1,000 to about 5,000 parts per million soluble silicate calculated as $SiO_2$ are effective for treating sodium carbonate solutions containing about 5 to about 550 parts per million carbon based on the sodium carbonate solution. The specific amounts of additives added to the aqueous sodium carbonate solution are in addition to the soluble aluminum ions and soluble silicate ions inherently present in the sodium carbonate solution resulting from conventional process operating methods. Obviously, as the soluble organic impurity concentration decreases or increases, the additive is added in either decreasing or increasing amounts respectively which amounts can be readily determined by those skilled in the art. More than 300 parts per million soluble aluminum ions or 5,000 parts per million soluble silicate ions calculated as $SiO_2$ may be added even though it is not desirable since higher concentrations reduce the purity of the sodium carbonate crystals produced without any additional improvement in bulk density or particle sizing.

The additives are incorporated in the sodium carbonate solution either between the filtering and crystallization steps and/or during crystallization. When the addition is performed between the filtering and crystallization steps, it may be done by adding the additive directly to filtered sodium carbonate solution when the solution is held in a storage vessel from which the solution is fed into the crystallizer or it may be done by simply adding the additive to the sodium carbonate solution as it is fed into the crystallizer.

The additive may be added all at one time or added continuously in lesser amounts over the entire crystallization cycle. Preferably, the additive is added continuously so that as the additive is used up, additional additive is present to maintain the desired crystal modification.

A preferred manner of practicing the invention involves dry-mining and calcining trona to obtain crude sodium carbonate whereby the sodium sesquicarbonate present in the trona is converted to sodium carbonate. This reaction may be presented as follows:

$$2(Na_2CO_3 \cdot NaHCO_3 \cdot 2H_2O) \rightarrow 3Na_2CO_3 + 5H_2O + CO_2$$

Calcination may be carried out at any temperature which is sufficient to convert the trona to crude sodium carbonate. Generally, calcination temperatures on the order of 150° to 800° C may be employed. If no organic-removal steps are to be used prior to evaporative crystallization of the sodium carbonate solution, calcination temperatures of about 400° to 800° C and preferably between 500° and 550° C are sufficient to convert the trona to sodium carbonate. If organic removal steps are to be utilized prior to evaporative crystallization, such as by carbon treatment, calcination temperatures on the order of 150° to 350° C, and preferably 150° to 170° C are employed.

After the trona is calcined to crude sodium carbonate, it is passed to the dissolving area where hot water or a hot solution of sodium carbonate in water at any desired sodium carbonate concentration, is brought into contact with the crude sodium carbonate to form an aqueous solution of crude sodium carbonate. The water employed may be softened or partially softened water. It is preferred that the liquid in the dissolved does not contain more than 170 ppm total hardness, expressed as calcium carbonate; this avoids the precipitation of calcium carbonate in the dissolvers.

The effluent from the dissolvers, which in the preferred process of this invention is a substantially saturated solution of sodium carbonate plus suspended insolubles and soluble organic impurities, is then passed to a classifier. In the classifier the coarse insolubles or solids, having a particle size of about 40 mesh (U.S. Standard Sieve), are separated from the crude sodium carbonate solution which retains any undissolved or suspended insolubles smaller than about 40 mesh. The crude sodium carbonate solution is then processed preferably by filtration to remove the remaining undissolved or suspended insolubles.

The overflow sodium carbonate solution, saturated with sodium carbonate and containing approximately 50 to 200 parts per million carbon as soluble organic impurities based on the sodium carbonate solution, may then be passed through a carbon column containing a packed bed of activated carbon. The carbon treatment represents the preferred method of operation and removes approximately 50% of the soluble organic impurities present in the sodium carbonate solution.

The sodium carbonate solution is then passed to a monohydrate crystallizer having an evaporating and crystallizing stage where water is evaporated from the sodium carbonate solution and sodium carbonate monohydrate is crystallized from the solution. In the typical crystallizing operation, the carbonate solution is passed through a series of evaporators, typically multiple effect evaporative crystallizers.

As the sodium carbonate solution is passed into the crystallizer, an aqueous solution containing soluble aluminum ions and/or soluble silicate ions calculated as $SiO_2$ is added to the sodium carbonate solution in amounts sufficient to provide at least 30 parts per million soluble aluminum ions and/or at least 1,000 parts per million soluble silicate ions calculated as $SiO_2$ above the amounts of aluminum ions and/or silicate ions already present in the sodium carbonate solution.

As the sodium carbonate solution passes through the crystallizers, a slurry of sodium carbonate monohydrate crystals and monohydrate crystallizer liquor is formed. From the crystallizers the slurry is treated to remove the monohydrate crystallizer liquor remaining on the sodium carbonate monohydrate crystals. Thereafter the crystals are heated in a dryer at a temperature of about 105° to about 130° C to convert the sodium carbonate monohydrate crystals to anhydrous sodium carbonate.

The invention will be better understood from a consideration of the following examples, and a reference to the attached illustrations. These illustrations are reflective photomicrographs of sodium carbonate crystals which clearly demonstrate the invention described and claimed herein, and are identified as follows.

*SODIUM CARBONATE CRYSTALS (−70 +100 mesh) TAKEN AT 30X MAGNIFICATION*

EXAMPLE 1

Comparative Run A

In order to show the beneficial effects of the additives herein described on the crystallization of sodium carbonate monohydrate, saturated solutions of sodium carbonate (30% $Na_2CO_3$) were prepared by dissolving trona ore calcined at 200° C in 85° C distilled water. The solutions were then clarified and filtered and subjected to crystallization. Crystallization was carried out by pouring 250 milliliters of the above solution into a vessel. The solution in the vessel was then heated to the boiling point, 104° C, and maintained at this temperature until half of the initial volume of solution was evaporated. The slurry produced was then centrifuged and the sodium carbonate monohydrate crystals were dried. Analysis of the mother liquor for ppm carbon revealed that the mother liquor contained about 530 ppm carbon based on the sodium carbonate solution.

Figure 1:
FIG. 1 shows crystals of sodium carbonate formed in a sodium carbonate solution containing about 530 ppm carbon, without the use of an additive.

In comparative Run A, no additives were present during crystallization. The crystals produced showed some twinning and were long, thin and poorly shaped. These crystals are illustrated in FIG. 1. Product specifications are set forth in Table I.

Run 1 — Process of the Invention

In Run 1, aluminum nitrate [$Al(NO_3)_3 \cdot 9H_2O$] was continuously added to the sodium carbonate solution present in the vessel after the solution reached the boiling point, 104° C. Aluminum nitrate was added until a total of 300 ppm aluminum ion ($Al^{+3}$) had been added. The crystals produced showed some twinning and were shorter than those obtained in Run A. Approximately 12 to 16% of the total aluminum added to the solution was found in the sodium carbonate monohydrate crystals. Product specifications are set forth in Table I.

Run 2 — Process of the Invention

Figure 2:
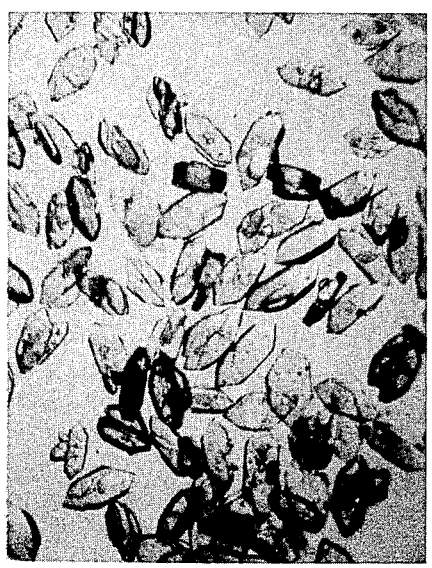
FIG. 2 shows crystals of sodium carbonate formed in the same sodium carbonate solution as FIG. 1, but in the presence of about 400 milligrams/liter activated alumina. *SODIUM CARBONATE CRYSTALS (−70 +100 mesh) TAKEN AT 25X MAGNIFICATION*

In Run 2, 400 milligrams/liter of activated alumina was added in bulk to the sodium carbonate solution in the vessel after the solution reached the boiling point, 104° C. The solution was then continuously agitated. The crystals produced were almost identical to those obtained in Run 1. Some aluminum was found in the sodium carbonate crystals. These crystals are illustrated in FIG. 2. Product specifications are set forth in Table I.

EXAMPLE 2

Comparative Run B

In Run B a 30% sodium carbonate solution was prepared by dissolving trona ore calcined at 200° C in 85° C distilled water. The solution was clarified, filtered and passed through a twelve foot long by two inch diameter packed bed of activated granular carbon maintained at 75° C. The carbon-treated solution was poured into a vessel and crystallized according to Example 1. Analysis of the mother liquor for ppm carbon revealed that the mother liquor contained about 145 ppm carbon.

Figure 3:
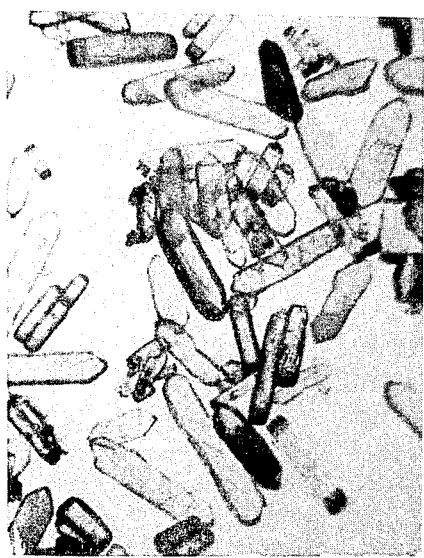
FIG. 3 shows crystals of sodium carbonate formed in a sodium carbonate solution containing about 145 ppm carbon, without the use of an additive.

In comparative Run B, no additives were present during crystallization. The crystals produced showed some twinning and were long, thin, and rounded. These crystals are illustrated in FIG. 3. Product specifications are set forth in Table I.

Run 3 — Process of the Invention

Figure 4:
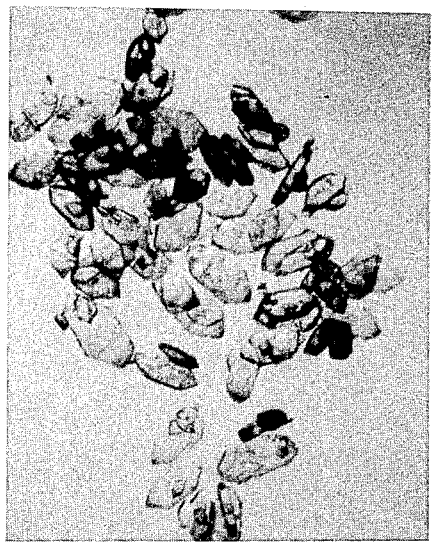
FIG. 4 shows crystals of sodium carbonate formed in the same sodium carbonate solution as FIG. 3 but in the presence of about 4,000 ppm silica gel.

In Run 3, 4,000 ppm silica gel ($SiO_2$) was added in bulk to the sodium carbonate solution in the vessel after the solution approached the boiling point, 104° C. The solution was then continuously agitated. The crystals produced contained few twins and were shorter than those obtained in Run B. These crystals are illustrated in FIG. 4. Product specifications are set forth in Table I. As is apparent from the product specifications of Runs B and 3, inventive Run 3 produced a crystal product which had a bulk density of 5 lb/ft³ lower than comparative Run B. The lower bulk density in Run 3, however, is primarily due to the different particle size distributions obtained and the more uniform shape of the crystals formed.

TABLE I

| | Particle Size Distribution (weight %) | | | | Bulk Density (lb/ft³) |
|---|---|---|---|---|---|
| | +50 | +100 | +200 | −200 (U.S. Standard Mesh) | |
| Example 1 | | | | | |
| Run A Blank | 5 | 59 | 97 | 3 | 52 |
| Run 1 Aluminum Nitrate | 25 | 83 | 98 | 2 | 55 |
| Run 2 Activated Alumina | 17 | 79 | 98 | 2 | 57 |
| Example 2 | | | | | |
| Run B Blank | 6 | 49 | 92 | 8 | 58 |
| Run 3 Silica Gel | 37 | 88 | 99 | 1 | 53 |

The invention being thus described, it will be obvious that the same may be varied in many ways. Such variations are not to be regarded as a departure from the spirit and scope of the invention, and all such modifications are intended to be included within the scope of the following claims.

What is claimed is:

1. A process for producing high bulk density sodium carbonate monohydrate crystals from an aqueous solution of sodium carbonate, which comprises: adding to said aqueous solution of sodium carbonate a crystal growth additive of at least 30 parts per million soluble aluminum ions, until the soluble aluminum ions in the sodium carbonate solution is about 30 to about 300 ppm soluble aluminum ions, said amount added being in addition to the amount of soluble aluminum ions inherently present in the sodium carbonate solution prior to the additive addition; crystallizing sodium carbonate monohydrate from the sodium carbonate solution; and recovering the sodium carbonate monohydrate crystals.

2. The process of claim 1 wherein about 30 to about 300 ppm soluble aluminum ions are added to the sodium carbonate solution.

3. The process of claim 1 wherein aluminum nitrate is added as the source of soluble aluminum ions.

4. The process of claim 1 wherein the additive is added to the sodium carbonate solution during crystallization.

5. A process for producing high bulk density sodium carbonate monohydrate crystals from trona, which comprises: calcining crude trona to obtain crude sodium carbonate; mixing the crude sodium carbonate with an aqueous liquor to form a solution of crude sodium carbonate; clarifying and filtering the crude sodium carbonate solution; adding to the clarified and filtered sodium carbonate solution a crystal growth additive of at least 30 parts per million soluble aluminum ions, until the soluble aluminum ions in the sodium carbonate solution is about 30 to about 300 ppm soluble aluminum ions, said amount added being in addition to the amount of soluble aluminum ions inherently present in the sodium carbonate solution prior to the additive addition; crystallizing sodium carbonate monohydrate from the sodium carbonate solution; and recovering the sodium carbonate monohydrate crystals.

6. The process of claim 5 wherein the additive is added to the sodium carbonate solution during crystallization.

7. The process of claim 5 wherein about 30 to about 300 ppm soluble aluminum ions are added to the sodium carbonate solution.

* * * * *